United States Patent [19]

Dumoulin

[11] 4,018,734
[45] Apr. 19, 1977

[54] ORGANOSILICON COMPOSITIONS WHICH IMPART NON-STICK PROPERTIES TO CELLULOSIC AND SYNTHETIC MATERIALS

[75] Inventor: Jean Dumoulin, Sainte Croix-en-Jarez, France

[73] Assignee: Rhone-Poulenc Industries, Paris, France

[22] Filed: June 6, 1975

[21] Appl. No.: 584,353

[30] Foreign Application Priority Data

June 10, 1974 France .............................. 74.19950

[52] U.S. Cl. .................... 260/29.1 SB; 260/31.2 R; 260/32.8 SB; 260/33.6 SB; 260/33.8 SB; 428/447

[51] Int. Cl.² ..................... C08K 5/00; C08K 5/01; C08K 5/07; C08K 5/10

[58] Field of Search .............. 260/31.2 R, 32.8 SB, 260/33.6 SB, 33.8 SB, 29.1 SB; 428/447

[56] References Cited

UNITED STATES PATENTS

| 3,202,542 | 8/1965 | Poje | 260/29.1 SB |
|---|---|---|---|
| 3,671,484 | 6/1972 | Cooper et al. | 260/33.6 SB |
| 3,821,154 | 6/1974 | Dumoulin et al. | 260/33.6 SB |
| 3,926,896 | 12/1975 | Dumoulin | 260/31.2 R |

*Primary Examiner*—Harry Wong, Jr.
*Attorney, Agent, or Firm*—Stevens, Davis, Miller & Mosher

[57] ABSTRACT

Organosilicon compositions which impart good and immediate non-stick properties to cellulosic and synthetic materials are provided comprising a mixture of dimethylpolysiloxane polymer, a catalyst, an epoxy silane, a crosslinking system and organic solvent, the crosslinking system comprising 70 to 95% of at least one organosilicon compound possessing at least 3 acyloxy groups bonded to one or more silicon atoms, which is a silane of the formula $RSi(OCOR'')_3$, a disilane, a disiloxane or a disilylalkane of the formula $(R'\lambda'COO)_{3-d'} R_{d'} Si(X)_f SiR_d(OCOR'')_{3-d}$, in which R and R'' are as defined above, X represents an oxygen atom or the alkylene radical $-(CH_2)_h-$, each of d and d', which may be identical or different, represents zero, 1 or 2, the sum $d + d'$ being 2 or 3, f represents zero or 1 and h represents 2 or 4, and 2) 5 to 30% of at least one hexaalkoxymethylmelamine, the alkoxy groups each having 1 to 4 carbon atoms.

6 Claims, No Drawings

ORGANOSILICON COMPOSITIONS WHICH IMPART NON-STICK PROPERTIES TO CELLULOSIC AND SYNTHETIC MATERIALS

The present invention relates to organosilicon compositions which can be used to provide flat cellulosic or synthetic materials with non-stick properties with respect to sticky or viscous substances, the non-stick properties being acquired as soon as the organosilicon compositions deposited in the form of thin layers on the materials to be treated have dried.

Numerous organosilicon compositions are known which, after drying, impart non-stick properties to flat materials such as various kinds of paper, and plastics sheets and films (see, for example, French Pat. Nos. 1,294,239, 1,443,657, 1,446,021, 1,494,615 and 1,595,718, French Applications Nos. 2,026,131 and 2,133,888, Belgian Pat. No. 786,300 and U.S. Pat. No. 3,532,766).

However, the desired non-stick characteristics are not always acquired as soon as the drying of the compositions deposited on the abovementioned materials is complete. When these characteristics are not obtained it is then absolutely necessary to store the coated materials for a period of time which can be as much as a week or more; during this storage period, an improvement in the non-stick properties generally takes place and the latter finally reach an optimum situation which scarcely changes thereafter. This process is obviously not very valuable because it is necessary to provide large areas for storing the materials.

The aim of the present invention is to overcome this disadvantage. The present invention provides organosilicon compositions prepared by mixing the following ingredients: (the parts and percentages being expressed by weight)

A. 100 parts of dimethylpolysiloxane polymers chosen from amongst
  i. $\alpha,\omega$-dihydroxydimethylpolysiloxane gums with a viscosity of at least 1 million cPo at 25° C,
  ii. mixtures containing at least 75% of the above gums and at most 25% of linear and cyclic dimethylpolysiloxane polymers of low molecular weight, present with these gums during the preparation of the latter by polymerisation of dimethylcyclopolysiloxanes by means of alkaline or acid catalysts, and
  iii. mixtures containing 60 to 90% of $\alpha,\omega$-dihydroxydimethylpolysiloxane oils with a viscosity from 300 cPo to 900,000 cPo at 25° C and 40 to 10% of $\alpha,\omega$-bis(-triorganosiloxy)-dimethylpolysiloxane gums with a viscosity of at least 1 million cPo at 25° C, blocked at their chain ends by units of the formulae $(CH_3)_3SiO_{0.5}$ and $(CH_3)_2(CH_2=CH)SiO_{0.5}$, B. 0 to 10 parts of methylhydrogenopolysiloxane oils of the general formula $(F_1)$: $(CH_3)_3SiO[Si(CH_3)_2O]_x$-$[SiH(CH_3)O]_y Si(CH_3)_3$ in which $x$ is zero or represents any number whatsoever up to at most 30 and $y$ represents any number whatsoever from 5 to 90, C. 2 to 10 parts of a crosslinking system, D. 0.5 to 5 parts of a catalyst which is an organic tin derivative or a polymer possessing

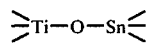

chains,

E. 0.05 to 2 parts of an epoxysilane chosen from those of the formula $(F_2)$:

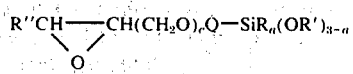

and of the formula $(F_3)$:

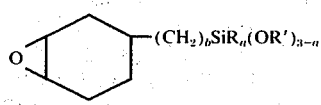

in which R represents an alkyl group with 1 to 4 carbon atoms or a phenyl group, R' represents an alkyl group with 1 to 3 carbon atoms or a methoxyethyl group, R'' represents a hydrogen atom or an alkyl group with 1 to 3 carbon atoms, Q represents an alkylene radical with 1 to 10 carbon atoms, $a$ represents 0 or 1, $b$ represents 0 or 2 and $c$ represents 0 or 1, and F. 500 to 2,500 parts of organic solvent.

These compositions are characterised in that the cross-linking system C comprisng 1) 70 to 95% of at least one organosilicon compound possessing at least 3 acyloxy groups bonded to one or more silicon atoms, which is a silane of the formula $(F_4)$: $RSi(OCOR'')_3$, a disilane, a disiloxane or a disilylalkane of the formula $(F_5)$: $(R''COO)_{3-d'} R_{d'} Si(X)_f SiR_d(OCOR'')_{3-d}$, in which formulae R and R'' are as defined above, X represents an oxygen atom or the alkylene radical $-(CH_2)_h-$, each of $d$ and $d'$, which may be identical or different, represents zero, 1 or 2, the sum $d+d'$ being 2 or 3, $f$ represents zero or 1 and $h$ represents 2 or 4, and of 2) 5 to 30% of one or more hexaalkoxymethylmelamines, the alkoxy group having 1 to 4 carbon atoms.

As indicated, the dimethylpolysiloxane polymers (A) can be chosen from $\alpha,\omega$-dihydroxydimethylpolysiloxane gums (i) with a viscosity of at least 1 million cPo at 25° C; these gums consist mainly of units of the formula $(CH_3)_2SiO$, but the presence of units of the formulae $CH_3(CH_2=CH)SiO$ and/or $CH_3SiO_{1.5}$ is not excluded provided they do not generally exceed 2% in number. The techniques for manufacturing these gums are well known; in a first step, dimethylcyclopolysiloxanes are preferably polymerised by means of a catalytic amount of an alkaline or acid agent and then the polymerised products are treated with calculated amounts of water (see French Pat. Nos. 1,134,005, 1,198,749 and 1,226,745). Thereafter, in a second step, these gums are isolated by removing, at a temperature generally above 100° C and under a pressure preferably below atmospheric pressure, the starting dimethylcyclopolysiloxanes present in equilibrium in the polymerisation reaction as well as the other polymers of rather low molecular weight formed during this reaction. All of these volatile dimethylpolysiloxane polymers, possessing linear and cyclic structures, represent at most 25% of the polymerised products. It is advisable, before distilling the volatile products, to neutralise the alkaline or acid agent used as the polymerisation catalyst. The gums thus prepared possess viscosities which range from 1 million cPo at 25° C to approximately 80 million cPo at 25° C.

The dimethylpolysiloxane polymers (A) can also be in the form of mixtures (ii) comprising at least 75% of the above gums and at most 25% of the linear and cyclic dimethylpolysiloxane polymers of low molecular weight which have just been described. In order to prepare such mixtures, it suffices to stop at the first stage of the preparation of the α,ω-dihydroxydimethylpolysiloxane gums. The presence of volatile polymers is not a disadvantage; in fact, it facilitates the dissolution of the gums during the preparation of the compositions according to the present invention.

The dimethylpolysiloxane polymers (A) can also be in the form of mixtures (iii) comprising 60 to 90% of α,ω-dihydroxydimethylpolysiloxane oils with a viscosity from 300 cPo at 25° C to 900,000 cPo at 25° C and 40 to 10% of α,ω-bis-(triorganosiloxy)-dimethylpolysiloxane gums with a viscosity of at least 1 million cPo at 25° C. The α,ω-dihydroxydimethylpolysiloxane oils which are present in these mixtures can be prepared by the process indicated for the preparation of the abovementioned α,ω-dihydroxydimethylpolysiloxane gums by increasing the amounts of water added to the polymerised products. On the other hand, in order to prepare α,ω-bis(triorganosiloxy)-dimethylpolysiloxane gums, the other constituents of the mixtures, the addition of water is of no use and is replaced by the addition of dimethylpolysiloxanes of low molecular weight blocked by $(CH_3)_3SiO_{0.5}$ and/or $(CH_3)_2(CH_2=CH)SiO_{0.5}$ units; in particular, it is possible to use dimethylpolysiloxanes corresponding to the formulae $(CH_3)_3SiO—Si(CH_3)_3$, $(CH_3)_2(CH_2=CH)Si-O—Si(CH=CH_2)(CH_3)_2$ and $(CH_3)_2(CH_2=CH)Si[OSi(CH_3)_2-]_vOSi(CH=CH_2)(CH_3)_2$, $v$ representing any number whatsoever which generally does not exceed 40. These gums possess viscosities which range from 1 million cPo at 25° C to at least 80 million cPo at 25° C.

The methylhydrogenopolysiloxane oils (B) used in an amount of at most 10 parts and preferably 8 parts per 100 parts of dimethylpolysiloxane polymers (A), have a rather low viscosity which lies, depending on the values of $x$ and $y$ in the formula ($F_1$), substantially within the range from 5 to 110 cPo at 25° C. The techniques for their preparation are now well developed; one of the techniques most used consists, in a first step, of cohydrolysing mixtures of chlorosilanes of the formulae $CH_3SiHCl_2$ and $(CH_3)_3SiCl$ or chlorosilanes of the formulae $CH_3SiHCl_2$, $(CH_3)_2SiCl_2$ and $(CH_3)_3SiCl$, the molar proportions of the chlorosilanes being calculated so that the numbers $x$ and $y$ fall within the specified ranges, that is to say 0 to 30 in the case of $x$ and 5 to 90 in the case of $y$. The cohydrolysis reaction is thereafter followed by a rearrangement of the cohydrolysed product in the presence of an alkaline or acid agent.

The catalysts (D), used in an amount from 0.5 to 5 parts and preferably 0.7 to 4.5 parts, per 100 parts of dimethylpolysiloxane polymers (A), are chosen from amongst:

Organic derivatives of tin which comprise (1) organo-tin salts of mono- or poly-carboxylic acids, such as dibutyl-tin or dioctyl-tin dilaurate, dibutyl-tin or dioctyl-tin di-(2-ethyl-hexanoate), dibutyl-tin or dioctyl-tin diacetate, tributyl-tin 2-ethyl-hexanoate, tributyl-tin acetate, tributyl-tin laurate, dibutyl-tin succinate and dioctyl-tin maleate, and (2) compounds of the formula $T_2Sn(SCH_2COOT)_2$ in which each T radical, which may be identical or different, represents an alkyl radical with 3 to 20 carbon atoms, such as propyl, butyl, hexyl, octyl, isooctyl, decyl, dodecyl and octadecyl radicals. By way of illustration, these compounds can correspond to the formulae $(n.C_4H_9)_2Sn(SCH_2COOiso-C_8H_{17})_2$ and $(n.C_8H_{17})_2Sn(SCH_2COOiso-C_8H_{17})_2$. The preparation of such compounds is given, for example, in Canadian Pat. No. 846,201 and French Pat. Nos. 1,477,892 and 1,488,631. And polymers possessing

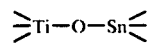

chains, which can be prepared by reacting alkyl titanates (the alkyl radical having 3 to 10 carbon atoms) with the organo-tin salts of mono- or poly-carboxylic acids mentioned above. Such polymers are mentioned in, for example, French Pat. No. 1,392,648 and British pat. specification No. 928,496.

The epoxysilanes (E), used in an amount from 0.05 to 2 parts, preferably 0.06 to 1.8 parts, per 100 parts of dimethylpolysiloxane polymers (A), correspond, as already indicated, to the abovementioned formulae ($F_2$) and ($F_3$) in which the symbols R, R', R'', Q, $a$, $b$ and $c$ appear.

Methyl, ethyl, n-propyl and n-butyl radicals may be mentioned by way of illustration of alkyl radicals with 1 to 4 carbon atoms, represented by R. Methyl, ethyl, propyl and isopropyl radicals are the alkyl radicals with 1 to 3 carbon atoms, represented by R' and R''.

Radicals of the formulae $—CH_2—$, $—(CH_2)_2—$, $—(CH_2)_3—$,

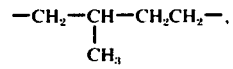

$—(CH_2)_5—$ and $—(CH_2)_8—$ may be mentioned by way of illustration of alkylene radicals with 1 to 10 carbon atoms, represented by Q.

More specifically, the epoxysilanes (E) can correspond to the formulae below,

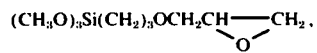

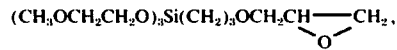

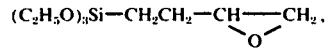

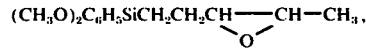

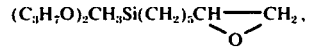

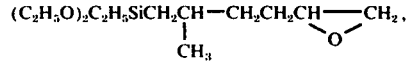

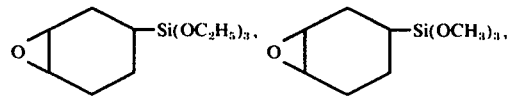

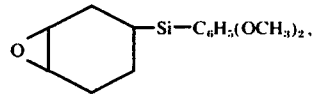

-continued

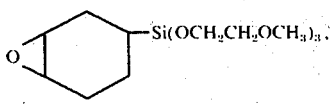

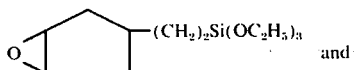

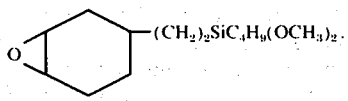

The preparation of these epoxysilanes and their characteristics are described extensively in the chemical literature, in particular in French Pat. Nos. 1,185,009, 1,526,231 and 1,548,971.

The organic solvents (F), used in an amount from 500 to 2,500 parts, preferably 600 to 2,300 parts, per 100 parts of dimethylpolysiloxane polymers (A) are typically as follows:

halogenated or non-halogenated alkanes and cycloalkanes such as hexane, heptane, octane, decane, dodecane, cyclopentane, cyclohexane, methylcyclohexane, petroleum fractions containing paraffin and/or cycloparaffin compounds, perchloroethylene, trichloroethylene and 1,2-dichloro-ethane, halogenated or non-halogenated aromatic hydrocarbons such as toluene, xylene, cumene, tetralin, chlorobenzene and ortho-dichlorobenzene, aliphatic ketones such as methyl ethyl ketone, methyl isopropyl ketone and methyl isobutyl ketone, and alkyl esters of monocarboxylic acids such as ethyl acetate and butyl acetate.

The crosslinking system (C), which characterises the invention, is used in an amount from 2 to 10 parts and preferably 2.5 to 9 parts, per 100 parts of dimethylpolysiloxane polymers (A). It contains two types of constituents, namely 70 to 95% of one or more organosilicon compounds possessing at least 3 acyloxy groups bonded to one or more silicon atoms, these compounds being silanes of the formula ($F_4$) mentioned above, disiloxanes, disilanes and disilylaklanes of the formula ($F_5$) mentioned above, and 5 to 30% by weight of one or more hexaalkoxymethylmelamines.

Specific examples of organosilicon compounds of formula ($F_4$) include those of the formulae
$CH_3Si(OCOCH_3)_3$, $C_6H_5Si(OCOCH_3)_3$,
$C_2H_5Si(OCOCH_3)_3$, $C_4H_9Si(OCOH)_3$,
$CH_3Si(OCOC_2H_5)_3$, $C_6H_5Si(OCOC_3H_7)_3$ and
$C_3H_7Si(OCOCH_3)_3$.

Specific examples of organosilicon compounds of formula ($F_5$) include those of the formulae
$(CH_3COO)(CH_3)_2Si$-$SiCH_3(OCOCH_3)_2$,
$(CH_3COO)_2CH_3SiOSiCH_3$-$(OCOCH_3)_2$,
$(CH_3COO)_2CH_3Si$-$CH_2CH_2SiCH_3(OCOCH_3)_2$,
$(CH_3COO)_2CH_3Si(CH_2)_4SiCH_3(OCOCH_3)_2$ and
$(C_2H_5COO)_3SiSi(C_6H_5)_2OCOC_2H_5$. These organosilicon compounds are described in the chemical literature, more precisely in French Pat. Nos. 1,137,495, 1,353,781 and 1,603,490.

The hexaalkoxymethylmelamines, the other type of constituents of the crosslinking system (C), correspond to the general formula:

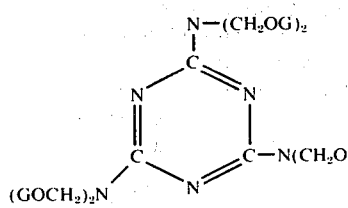

in which each G radical, which may be identical or different, represents a methyl, ethyl, propyl or butyl group.

Hexamethoxymethylmelamine, tetramethoxydiethoxymethylmelamine, tetramethoxydibutoxymethylmelamine and hexaethoxymethylmelamine are typical melamines which can be used in the compositions of this invention.

These nitrogen-containing compounds, which are available commercially, can be prepared easily by reacting hexamethylolmelamine with excess of an alkanol or a mixture of alkanols with 1 to 4 carbon atoms, in the presence of an acid, as mentioned, in particular, in U.S. Pat. No. 2,847,388.

The compositions of the invention can be prepared simply by mixing the various constituents A, B, C, D, E and F at ambient temperature, without incorporating them in any special order. However, in order to produce homogeneous solutions, which are stable when stored, more rapidly, it is advisable to dissolve the dimethylpolysiloxane polymers (A) and the methylhydrogenopolysiloxane polymers (B) in all, or in a large part of, the solvent (F), and thereafter to add, separately or in the form of mixtures (it being possible for these mixtures to be dissolved in a minor part of the solvent (F)) the catalysts (D), the epoxysilanes (E) and the hexaalkoxymethylmelamines. The organosilicon compounds possessing acyloxy groups are finally added to the solutions thus obtained. This process can be improved by preparing beforehand, firstly, solutions of the polymers (A) and (B) in a suitable proportion of the solvent (F), and secondly, solutions of the catalysts (D), the epoxysilanes (E) and the hexaalkoxymethylmelamines in the remaining proportion of the solvent (F). At the time of use, these two types of solutions are mixed in suitable proportions and then calculated amounts of the oganosilicon compounds possessing acyloxy groups are added.

The compositions according to the present invention are stable for several hours in an open container left exposed to the atmosphere; moreover, they are rather insensitive to the impurities which are often present in coating tanks, such as scale residues and gelled particles originating from the curing of previous compositions.

These compositions can be applied by means of the devices used on industrial paper-coating machines such as gravure rollers and the so-called "Reverse Roll" system. Once deposited on the supports, the compositions can be dried and cured in a few seconds by passing through tunnel ovens heated to about 60°–210° C.

The time taken to pass through these ovens generally varies from 2 to 30 seconds and depends, for a given oven length, on the speed at which the coated supports travel (this speed can exceed 200 meters per minute). A support of cellulosic materials will generally pass through more rapidly (for example, at a speed of 3 m/second for a temperature above 140° C) than a support based on plastics material; in fact, the latter cannot withstand high temperatures and should thus be exposed to a lower temperature but for a longer period of time; for example, it will pass through at a speed of 0.75 m/second for a temperature of the order of 80° C.

The amounts of the composition deposited on the supports can vary; it is most frequently from 3 to 30 g/m². They naturally depend on the proportion of organosilicon compounds in the compositions, on the nature of the supports to be treated and on the non-stick properties desired. Thus, the amounts deposited on nonporous supports, such as highly refined papers treated with carboxymethyl-cellulose and sheets of plastics material, are generally low and generally do not exceed 15 g/m². On the other hand, it is generally necessary to deposit markedly higher amounts on porous supports, in order to produce the same degree of non-stick character. However even in this case the amounts can remain rather low, of the order of 12 to 20 g/m², if care is taken to choose dimethylpolysiloxane polymers (A) with a high viscosity, for example α,ω-dihydroxydimethylpolysiloxane gums with a viscosity of 15 to 50 million cPo at 25° C.

After the supports have passed through the tunnel ovens, a cured layer of organosilicon polymers, generally representing 0.05 to 5 g/m², remains. This layer imparts very good non-stick characteristics to the supports as soon as they issue from the tunnel ovens, and these non-stick characteristics do not change with the passage of time. Such supports can thus be used immediately without having to be stored in order to effect possible "maturing".

The compositions of the present invention can be applied to any materials which will subsequently be in contact with tacky, sticky, viscous, gummy or pasty substances or substances which give off moisture. These cellulosic or synthetic materials, which may or may not be porous, thus comprise diverse varieties of paper, such as Kraft paper which can have been refined to any extent whatsoever, glassine and sulphuric acid-treated papers, cardboards, vegetable parchment, papers coated with polyethylene or carboxymethyl-cellulose, sheets made of regenerated cellulose (such as "Cellophane") or of cellulose polyacetate, sheets made of plastics such as those made of polyethylene, polypropylene and polyethylene terephthalate, metal foils, woven fabrics based on synthetic fibres, glass fibres or asbestos fibres, and non-woven fibrous materials whether they are based on cellulosic fibres or synthetic fibres or a mixture of these fibres.

The materials to which non-stick properties have thus been imparted can be used as, for example, spacers, separating supports, transfer papers and films, and packagings (1) for tacky materials such as confectionery, pastry, raw rubbers, pitches and bitumens, and waxes or (2) for foodstuffs which give off moisture such as fish and meat.

In particular, it is valuable to use the coated substrates for manufacturing small or large decorative panels; the manufacture of these panels consists, in a first step, of depositing a layer of adhesive on the face of a support, such as Kraft paper or plastics sheet, which has been rendered non-stick by depositing thereon a composition according to this invention, and then, in a second step, of applying the reverse side of a decorative element such as a tapestry to the face which has been coated with adhesive; during this contact, the adhesive becomes fixed to the reverse side of the decorative element. These combinations comprising non-stick supports/adhesives/decorative elements can be stored for as long a period as desired and it is sufficient simply to detach the support in order to use them; the adhesive panels are then ready to be laid.

The following Examples further illustrate the present invention.

EXAMPLE 1

100 parts of a gummy mixture (prepared as described below) of dimethylpolysiloxane polymers, with a William plasticity of 150, containing 0.0055% by weight of hydroxyl groups bonded to silicon atoms, dissolved in 1,330 parts of a mixture of solvents consisting of 330 parts of xylene and 1,000 parts of a petroleum cut taken between 93° C and 114° C and consisting mainly of paraffin-type hydrocarbons, are run into a suitable container.

A mixture consisting of 1.6 parts of dibutyltin dilaurate, 0.2 part of the epoxysilane of the formula

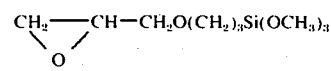

and 0.5 part of hexamethoxymethylmelamine, dissolved in 10 parts of methyl ethyl ketone, is then added.

3.3 parts of methyltriacetoxysilane are finally incorporated into the homogeneous solution obtained. The bath thus formed is divided into two substantially equal portions. A different support is treated with each of these two portions, namely: a calendered bleached Kraft paper ($P_1$), formed from a pulp refined to 65° Shopper, covered on one of its faces with a thin layer (approximately 0.5 g/m²) of carboxymethyl-cellulose, and a non-refined bleached Kraft paper ($P_2$) covered on one of its faces with a polyethylene film of thickness substantially 15 microns.

The non-stick treatment is carried out on the covered face of the supports $P_1$ and $P_2$; it is effected, in the case of the support $P_1$, by means of a device comprising an inking cylinder and a Mayer smoothing bar, and in the case of the support $P_2$, by means of a gravure roller. These devices are mounted on industrial paper-coating machines.

The amounts of the bath deposited are 10 g/m² on the support $P_1$ and 5 g/m² on the support $P_2$. These deposits are dried and cured simultaneously by passing the supports through a tunnel oven of length 15 m, the support $P_1$ being subjected to a temperature of 150° C for 5 seconds and the support $P_2$ to a temperature of 120° C for 15 seconds.

At the outlet of the tunnel oven, the support $P_1$ is finally coated with a cured layer of silicone, the weight of which is of the order of 0.6 g/m², and the support $P_2$ is coated with a cured layer of the order of 0.3 g/m².

An adhesive tape of the sparadrap type is applied to the coated face of each support, and the force necessary to detach the tape from the support is measured. In order to carry out this measurement, one end of the tape is folded back through 180° and then a force is exerted on this end, by means of a tensometer, so as to cause the tape to be detached, the rate of detachment being 25 cm/minute. For both the supports considered, $P_1$ and $P_2$, the detachment force is 2g for a 1 cm tape width; according to this test, the non-stick properties of these two supports are thus excellent.

However, a more severe test is carried out for the purpose of checking whether the non-stick characteristics, firstly, are good no matter what the nature of the adhesive or the form in which it is used may be, and secondly, are acquired immediately on issuing from the tunnel oven. For this purpose the coated face of each support $P_1$ and $P_2$ is covered, as soon as it issues from the tunnel oven, with a 50% strength by weight solution of an adhesive in in acetone; this adhesive is a copolymer formed from two compounds, vinyl acetate and 2-ethyl-hexyl maleate in a molar ratio of 46/54, respectively.

The amounts of the solution of the adhesive which are deposited are increased to 50 g/m². The solvent is removed by passing each support for 2 minutes through a tunnel oven heated to 130° C. A polyethylene terephthalate film is then applied to the face of each support, covered with the adhesive copolymer, and then the whole is kept under a press for 24 hours, the pressure exerted being 24 g/cm². In the manner indicated above, a free end of the polyethylene terephthalate film is folded back through 180°, this end is fixed between the jaws of a tensometer and is pulled at a rate of 25 cm/minute. The force necessary to detach the polyethylene terephthalate film (to which the adhesive is now bonded by transfer) from the supports $P_1$ and $P_2$ is 4 g for a 1 cm film width.

Again the coated face of each support $P_1$ and $P_2$ is covered with the 50% strength solution of the adhesive in acetone, not as soon as the support issues from the tunnel oven, but after ageing by exposure to the atmosphere for eight days following its removal from the tunnel oven. The above test is then carried out in order to measure the force necessary to detach the polyethylene terephthalate film; the value found is also 4 g/cm.

These results indicate that the non-stick characteristics of the supports $P_1$ and $P_2$ are not only very good but are also acquired immediately on issuing from the tunnel oven and that, moreover, they are not changed by contact between the supports and the solvent for the adhesive.

The gummy mixture of dimethylpolysiloxane polymers is prepared in the following way: 1,000 g of anhydrous octamethylcyclotetrasiloxane are introduced into a 2 l flask which has been placed under a dry nitrogen atmosphere, and are heated to 160° C; 10 mg of potassium hydroxide are then added and the temperature of 160° C is maintained, whilst stirring, for 30 minutes. At this stage, the mixture has the appearance of a gum; 50 mg of water are then introduced and the contents of the flask are kept at the temperature of 160° C for 3 hours. At the end of this period of time, the gummy mixture is neutralised by means of a carbon dioxide gas stream and is allowed to cool at atmospheric pressure, under the protection of a gentle stream of anhydrous nitrogen.

EXAMPLE 2

100 parts of the gummy mixture of dimethylpolysiloxane polymers, described in Example 1, dissolved in 1,500 parts of a mixture of solvents containing 200 parts of xylene and 1,300 parts of methyl ethyl ketone are introduced into a suitable container. A mixture consisting of 1.8 parts of dioctyl-tin maleate, 0.3 part of the epoxysilane of the formula

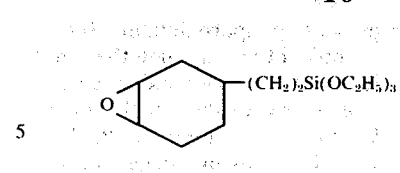

and 0.6 parts of tetramethoxy diethoxymethylmelamine, dissolved in 8 parts of methyl isobutyl ketone, is added to the above solution which is stirred.

4.5 parts of the disiloxane of the formula $(CH_3COO)_2CH_3Si\text{-}OSi\text{-}CH_3(OCOCH_3)_2$ are added to the homogeneous solution obtained.

The bath thus formed is poured into the coating tank of an industrial paper-coating machine and is then deposited, by means of a gravure roll mounted on this machine, on one face of a polyethylene film of thickness 100 microns. The amount of bath sprayed onto the film is of the order of 6 g/m². This deposit is dried by passing the film for 20 seconds through the tunnel oven, heated to 80° C, of the machine. A cured silicone layer, in an amount as much as 0.35 g/m², remains anchored to the film. An adhesive tape of the sparadrap type is applied to the coated face of the film and then the force necessary to detach the adhesive tape from the film is measured in the manner described in Example 1. A force of 3 g/cm is found; this value indicates that the polyethylene film possesses good non-stick properties.

EXAMPLE 3

104 parts of a mixture of organopolysiloxane polymers consisting of 70 parts of an $\alpha,\omega$-dihydroxydimethylpolysiloxane oil with a viscosity of 500 cPo at 25° C, 30 parts of an $\alpha,\omega$-bis-(trimethylsiloxy)-dimethylpolysiloxane gum with a viscosity of 30 million cPo at 25° C and 4 parts of a methylhydrogenopolysiloxane of the average formula $(CH_3)_3Si[OSiH(CH_3)]43\text{-}.2OSi(CH_3)_3$ with a viscosity of approximately 20 cPo at 25° C, in the form of a solution in 1,600 parts of xylene, are introduced into a suitable container. A mixture consisting of 1.7 parts of the organothio-tin compound of the formula $(n.C_4H_9)_2Sn(SCH_2COO\ iso\text{-}C_8H_{17})_2$, 0.2 part of the epoxysilane of the formula and 0.5 part of tetramethoxydibutoxymethylmelamine, dissolved in 8 parts of ethyl acetate, is added to the above solution which is stirred. Finally, after a homogeneous solution has been obtained, 5 parts of the disilane of the formula $(CH_3COO)_2CH_3SiCH_2CH_2Si\text{-}CH_3(OCOCH_3)_2$ are introduced.

The bath thus obtained is used to coat the face, which has been covered with carboxymethyl-cellulose, of a Kraft paper support (support identical to the support $P_1$ described in Example 1).

The bath is applied, as indicated in Example 1, by means of a device comprising an inking cylinder and a Mayer smoothing bar; the amount of bath deposited is of the order of 10 g/m². This deposit is then dried and cured by passing for 5 seconds through a tunnel oven heated to 150° C. In order to determine the non-stick character of the support, covered in this way with a thin coating of silicone representing approximately 0.6 g/m², a sparadrap tape is applied to it and then the free end of this tape is pulled in the manner indicated in Example 1. The force necessary to detach the tape from the support is 2.5 g for a 1 cm tape width; this value shows that the non-stick treatment carried out on the support is effective.

I claim:

1. An organosilicon coating composition which comprises, by weight:
   A. 100 parts of dimethylpolysiloxane polymer selected from the group consisting of
      i. an α,ω-dihydroxydimethylpolysiloxane gum with a viscosity of at least about 1 million cPo at 25° C.,
      ii. a mixture containing at least about 75% of said gum and at most about 25% of low molecular weight linear or cyclic dimethylpolysiloxane polymer present during the preparation of said gum by polymerisation of dimethylcyclopolysiloxane by means of alkaline or acid catalyst, and
      iii. a mixture containing about 60 to 90% of α,ω-dihydroxydimethylpolysiloxane oil with a viscosity from 300 to 900,000 cPo at 25° C., and about 40 to 10% of α,ω-bis-(triorganosiloxy)-dimethylpolysiloxane gum with a viscosity of at least 1 million cPo at 25° C., blocked at its chain ends by units of the formulae: $(CH_3)_3SiO_{0.5}$ and/or $(CH_3)_2(CH_2=CH)SiO_{0.5}$,
   B. 0 to 10 parts of a methylhydrogenopolysiloxane oil of the general formula:

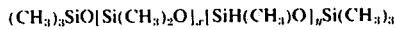

in which $x$ is zero or an integer or non-integral number of at most 30 and $y$ represents an integral or non-integral numbers from 5 to 90,
   C. 2 to 10 parts of a crosslinking system,
   D. 0.5 to 5 parts of a catalyst selected from the group consisting of an organic tin derivative and a polymer possessing

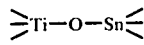

chains,
   E. 0.05 to 2 parts of an epoxysilane selected from the group consisting of epoxysilanes of the formula:

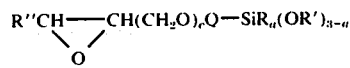

and of the formula:

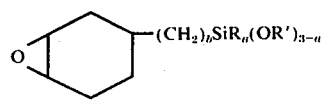

in which R represents an alkyl group with 1 to 4 carbon atoms or a phenyl group, R' represents an alkyl group with 1 to 3 carbon atoms or a methoxyethyl group, R" represents a hydrogen atom or an alkyl group with 1 to 3 carbon atoms, Q represents an alkylene radical with 1 to 10 carbon atoms, $a$ represents 0 or 1, $b$ represents 0 or 2, and $c$ represents 0 or 1, and
   F. 500 to 2,500 parts of organic solvent selected from the group consisting of a halogenated or non-halogenated alkane and cycloalkane, a halogenated or non-halogenated aromatic hydrocarbon, an aliphatic ketone and an alkyl ester of a monocarboxylic acid, the crosslinking system (C) comprising (1) about 70 to 95% of at least one organosilicon compound possessing at least 3 acyloxy groups bonded to one or more silicon atoms, which is a silane of the formula: $RSi(OCOR")_3$, a disilane, a disiloxane or a disilylalkane of the formula: $(R"COO)_{3-d}R_d Si(X)_f SiR_{d'}(OCOR")_{3-d'}$, in which R and R" are as defined above, X represents an oxygen atom or the alkylene radical $—(CH_2)_h—$, each of $d$ and $d'$, which may be identical or different, represents zero, 1 or 2, the sum $d + d'$ being 2 or 3, $f$ represents zero or 1 and $h$ represents 2 or 4, and 2) about 5 to 30% of at least one hexaalkoxymethylmelamine, the alkoxy groups each having 1 to 4 carbon atoms.

2. A composition according to claim 1, in which the organosilicon compound possessing acyloxy groups of the crosslinking system (C) has the formula $CH_3Si(OCOCH_3)_3$, $(CH_3COO)_2CH_3SiOSiCH_3(OCOCH_3)_2$ or $(CH_3COO)_2CH_3Si-CH_2CH_2SiCH_3(OCOCH_3)_2$.

3. A composition according to claim 1 in which the hexaalkoxymethylmelamines of the crosslinking system (C) is hexamethoxymethylmelamine, tetramethoxydiethoxymethylmelamine or tetramethoxydibutoxymethylmelamine.

4. A composition according to claim 1 which contains 2.5 to 9 parts of crosslinking system (C) per 100 parts of (A).

5. A composition according to claim 1 which comprises, by weight:
   A. 100 parts of a mixture as defined in (ii),
   C. 2.5 to 9 parts of a crosslinking system comprising
      1. about 70 to 95% of an organosilicon compound selected from the group consisting of $CH_3Si(OCOCH_3)_3$, $(CH_3COO)_2CH_3SiOSiCH_3(OCOCH_3)_2$ and $(CH_3COO)_2CH_3SiCH_2CH_2SiCH_3(OCOCH_3)_2$ and 2 about 5 to 30% of a hexaalkoxymethylmelamine selected from the group, consisting of hexamethoxymethylmelamine, tetramethoxydiethoxymethylmelamine and tetramethoxydibutoxymethylmelamine,
   D. 0.7 to 4.5 parts of a compound of formula: $T_2Sn(SCH_2COOT)_2$ in which each T radical, which may be identical or different, represents an alkyl radical with 3 to 20 carbon atoms,
   E. 0.06 to 1.8 parts of an epoxysilane as defined in claim 1 and
   F. 600 to 2,300 parts of a solvent selected from the group consisting of a halogenated or non-halogenated alkane and cycloalkane, a halogenated or non-halogenated aromatic hydrocarbon, an aliphatic ketone and an alkyl ester of a monocarboxylic acid.

6. A method of coating a flat cellulosic or synthetic material to provide a non-stick coating thereon which comprises applying thereto a composition as defined in claim 1.

* * * * *